United States Patent Office 2,875,615
Patented Mar. 3, 1959

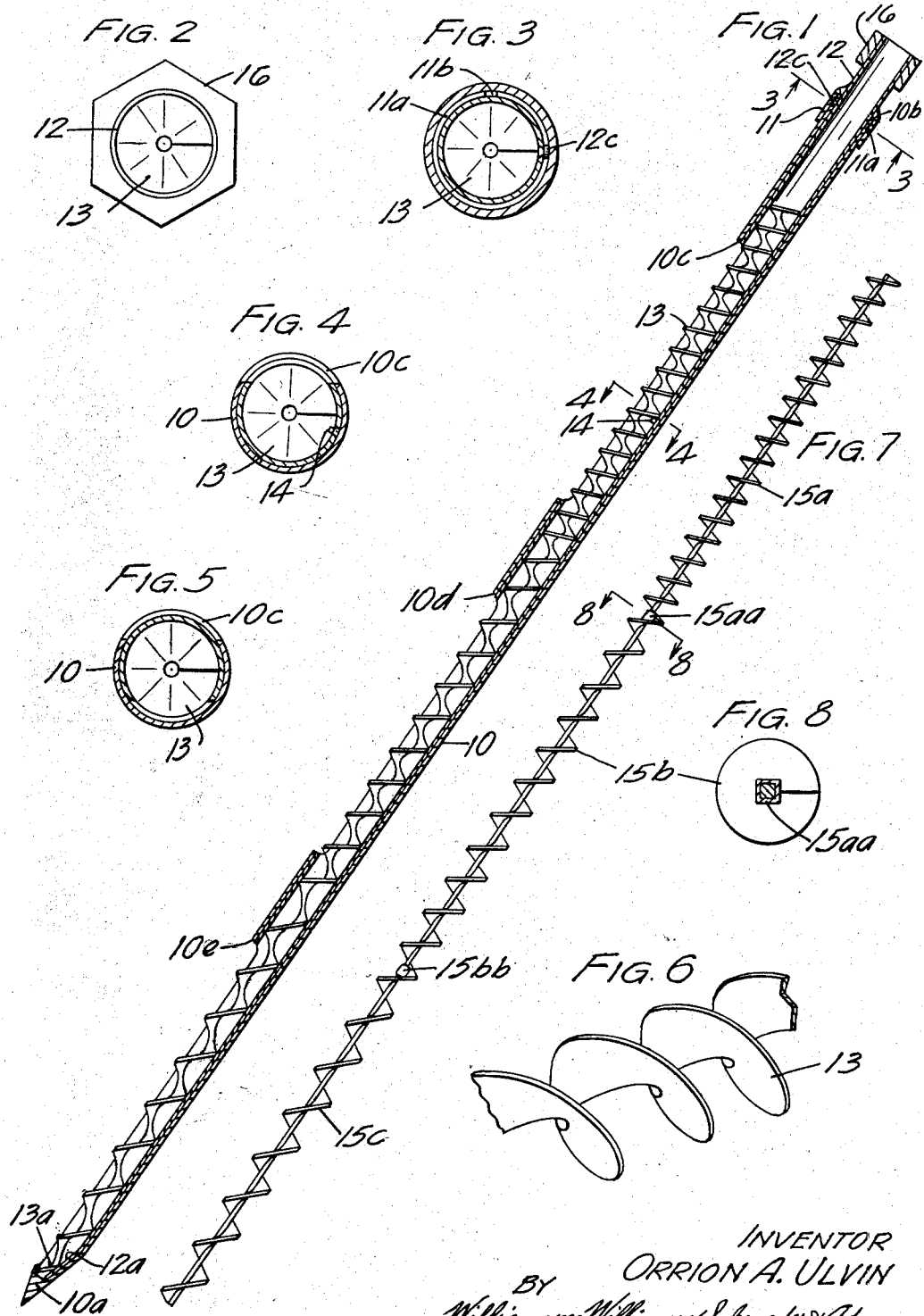

2,875,615
GRAIN AND SEED PROBE
Orrion A. Ulvin, Minneapolis, Minn.

Application September 2, 1954, Serial No. 453,805

1 Claim. (Cl. 73—425)

This invention relates to grain and seed probes for use in obtaining samples from cars, trucks and seed containers.

Grain-sample probes most generally used at the present time comprise inner and outer elongated tubes coaxially mounted one within the other for relative oscillation through manipulation of an upwardly extending handle portion connected with the inner tube. The exterior tube is closed and pointed at its lower end for facilitating downward probing of grain or seed and both tubes are provided with corresponding series of vertically spaced longitudinal grain-receiving openings at a plurality of different heights correlating with the interior of the inner tube. The upper ends of the two tubes are open so that the combined sample obtained through entering of the granular material at the various levels may be subsequently discharged by gravity flow therefrom and thereafter inspected and analyzed. The interior diameter of such probes, i. e. of the inner tube, varies from ⅜ inch up to approximately 2 inches, depending on the use to which the probes are put, the smaller diameters, of course, being used in sampling fine seeds such as alfalfa and clover and the probes of greater length and larger diameters being used for sampling the coarser grains or such materials as soy beans.

In using such probes, the lower and pointed end is forcibly thrust downward into the grain or seeds contained in a boxcar, truck or in a seed bag or container, at such time the inner tube being turned to bring the receiving openings thereof out of alignment with the corresponding openings of the outer tube. Thereafter, with the probe properly positioned vertically, the inner tube is turned to bring the two sets of receiving openings of the tubes into registration whereupon the granular material enters the continuous open inner tube and, thereafter, the inner tube is again turned to original position to confine the sample within the tube. The theory is that sample fragments may be taken from a plurality of different levels of the grain or seed which, in aggregate, when discharged from the upper and open end of the probe, will be truly representative of the grain or seed shipped or purchased. Actually, because of the inherent and varying characteristics of the various grains and seeds, the upper stratum of the granular material contained in the car or container flows much more readily into the probe, in most instances entering in the uppermost entrance or slot and immediately dropping and flowing with smaller fragments of grain which may, by pressure, work into the lower receiving openings. The result is, with most grains and seeds, that the aggregate sample, even though a series of from three to seven vertically spaced entrance slots are provided, is constituted to a substantial extent of granular material from the top and upper stratas of the grain or seed in car or container.

It is a well known fact that where "doctoring-up" of the material to meet specifications is attempted, the material below grade is positioned near or at the bottom of the car. Samples taken with such conventional probes are not truly representative of the material sold or shipped in its entirety.

It is an object of my invention to provide an economical, highly efficient grain and seed probe wherein the combined sample may be discharged from one end of the probe, but wherein accurate provision is made for assuring that actual fragments taken at different heights or different strata of the grain or seed sample will be effected.

More specifically, it is an object to provide a probe of the type described wherein a stationary spiral, particle-receiving and retaining element is positioned within the interior tube, preferably having a variable pitch or varying pitches throughout its length scientifically conceived to retain and prevent downward flow of particles admitted at the different entrance openings and thus assuring a true representative sample throughout the various strata of material, but, nevertheless, being adapted to be discharged from one end of the probe by a tamping or longitudinal shaking action.

These and other objects and advantages of my invention will more fully appear from the following description made in connection with the accompanying drawing wherein like reference characters refer to the same or similar parts throughout the several views and in which:

Figure 1 is a view taken for the most part in longitudinal section and partially in full, of an embodiment of my invention with the inner tube turned to effect registration of the material entrance slots for receiving grain or seeds in probing;

Figure 2 is a plan view of the upper end of the probe;

Figures 3 and 4 are cross sections taken along the lines 3—3 and 4—4 respectively of Figure 1 looking in the direction of the arrows;

Figure 5 is a cross section similar to that of Figure 4 showing the relationship of the inner and outer tubes when the probe is closed for retention and withdrawal of the sample;

Figure 6 is a fragmentary perspective of a portion of one type of spiral material-retaining element detached;

Figure 7 is a side elevation of an alternative form of sectional spiral grain-retaining element; and Figure 8 is a cross section taken on the line 8—8 of Figure 7.

Referring now to the form of the invention illustrated in Figures 1 to 5 inclusive, I provide an elongated rigid outer tube 10 which is preferably constructed from a non-corrosive metal such as stainless steel or copper, converging at its lower end to a closed point 10a, and having an open upper end 10b to which is externally affixed, as shown, a reinforcing collar 11. A series of vertically or longitudinally spaced enlarged slots 10c, 10d and 10e are formed through the body of tube 10 disposed, as shown, in longitudinal alignment although, of course, they may be staggered or arranged spirally of the tube, if desired. The lower slot 10e preferably extends downwardly into the converging point portion of the closed end of the tube in order that a fragment of grain or seed may be obtained from very closely adjacent the lower extremity of the probe.

Within the outer tube 10, an elongated, inner tube 12 is coaxially mounted telescoped in tube 10 with slight clearance for permitting relative oscillation of the two tubes. Tube 12 has a series of elongated, material entrance slots corresponding in number, shape and size to the entrance slots 10c, 10d and 10e of the outer tube and similarly spaced and arranged with reference to the periphery of inner tube 12 to be brought into precise registration with the entrance slots of the outer tube when tube 12 is turned relative to tube 10 to a predetermined position. The inner tube 12 has a lower end 12a tapered downwardly to conform symmetrically with the interior of the lower portion 10a of the outer tube.

To facilitate relative oscillation of tubes 10 and 12 and to prevent longitudinal displacement of the inner tube when the probe is inverted for discharging a sample, suitable means are provided between the collar 11 at the upper end of the outer tube and the upper portion of inner tube 12 such as a retaining lug 12c affixed laterally to the exterior of the upper portion of tube 12, which is engaged and confined within an annular groove 11a provided in the collar 11 at the upper portion thereof which extends beyond the upper extremity of outer tube 10. A short longitudinal slot 11b extends from the upper extremity of collar 11 into communication with the annular groove 11a to facilitate insertion and connection of the lug 12c with said annular groove.

In Figure 1, a continuous, spiral, grain-receiving and retaining element 13 is mounted within inner tube 12 having, as shown, a variable pitch throughout its length with the pitch becoming increasingly steeper or greater from top to bottom. This retaining element, as shown in Figures 1 and 6, may be in the form of a continuous, non-corrosive metal ribbon or strip properly spiraled throughout its length to closely fit within the confines of inner tube 12 and having an abutment lower end 13a of diminished size and extending generally axially for engagement with the closed lower end 10a of the outer tube. The spiral retaining element 13 may be rigidly affixed in the position shown within inner tube 12 by welding at a few points in the spiral periphery thereof, but it is preferably releasably retained in the inner tube as by a small countersunk screw 14 (see Figure 4) to engage and abut an edge of the spiral and prevent longitudinal displacement of the element 13 when the probe is inverted and longitudinally tamped or shaken. By release of the screw 14, the spiral retaining element may be longitudinally slid through the open and upper end of the probe and cleaned or polished when desired.

It is important that the pitch of the portion of the grain or particle-receiving and retaining element 13 which cooperates with the upper entrance slot 10c of the outer tube be less steep than the average pitch of the next lower section of the element which cooperates with the intermediate entrance slot 10d and that the average pitch of each succeeding lower section of spiral element 13 be steeper or greater than the preceding section. Excellent results are obtained from a variable-pitch, continuous, spiral ribbon or screw having an average pitch throughout the upper section thereof aligned with the upper openings of the two tubes within a range of 20° to 32° and having an average pitch in the next lower section aligned with entrance slot 10d of the outer tube within a range of 25° to 40° and having an average pitch range in the lowermost section thereof varying from 40° to 60°.

The upper extremity of inner tube 12 is preferably provided with a heavy enlargement such as a hexagonal collar 16 constituting a handle.

While reasonably successful results can be obtained by a screw or spiral retaining element having a constant pitch throughout its length within a range of from 25° to 45°, it is preferable to have more convolutions of the spiral element and less pitch and, consequently, more resistance to spiral flow downwardly of the granular material in the uppermost section of the element 13 with correspondingly graduated and lesser resistance sections and, consequently, greater average pitch at points of the spiral element aligned with the successively lower entrance slots.

In Figure 7, I illustrate an alternative form of grain-receiving and retaining element composed of three axially aligned interconnected sections 15a, 15b and 15c respectively. In this case, each section is made in the form of an auger mounted on a small-diameter axial shaft. The pitch of the spiral in each section is uniform throughout but, as is clearly shown in Figure 7, each section has a successively increased or steeper pitch. The lower section 15c has, at the upper extremity of its shaft, a squared end for connection with a squared socket 15bb at the lower end of the shaft of the intermediate section and, likewise, at the intermediate auger section 15b there is a squared end at the upper extremity of its shaft for locking and engagement with a squared socket 15aa in the lower end of the shaft section 15a. The spiral sections 15a, 15b and 15c may be compactly disposed within the inner tube 12 of the probe and interconnected and retained in operative position in a manner similar to the form first described.

*Operation*

In use with the inner tube 12 turned to disalign the material entrance slots thereof from the corresponding entrance slots 10c, 10d and 10e of the outer tube, the probe is thrust downwardly into the grain or seeds to be sampled. The thrust is continued preferably until the lower point 10a reaches the bottom of the car, truck or container of the granular material to insure obtaining a sample fragment from the bottom stratum. Thereafter, the handle 16 at the upper end of the inner tube is slowly turned while the outer tube 10 is grasped near its upper end, thereby slowly bringing the material entrance slots of the two tubes first into alignment and then to subsequently close the entrances to confine the sample fragments taken. During the period of registration of the two sets of slots, pressure and flow of the material sampled causes small fractions of the material to be forced and to flow into the inner tube and between the multiplicity of convolutions in the spiral retaining member. Actually, what occurs is that a great multiplicity of small fragments at different heights are received between said respective convolutions of the retaining member and that the various strata of the material are sampled.

In other words, for each of the elongated, vertically spaced entrance portions of the probe, a plurality of very small fragments are received between the respective convolutions of the spiral element.

The probe is removed with the material contained therein and subsequently the probe may be inverted with the open end disposed downwardly and may be tamped or reciprocated longitudinally thereby causing the aggregate sample to move spirally outward for discharge upon a table, pan or other receiving medium. The sample so obtained will be truly representative of grain or seed withdrawn at height intervals throughout almost the entire height of the material sampled.

Not only do the many convolutions of the spiral-retaining element provide separate sample-obtaining chambers or portions, but material forced in between said convolutions will not readily flow downwardly but, because of its viscosity, will be retained in the spiral-receiving chamber until, subsequently, when the probe is inverted and shaken or reciprocated.

Since grain or seeds from the top of a pile or confined volume will inherently flow more readily into a probe recess than the particles discharged at lower levels, it is desirable to make the spiral less steep or with less pitch in the upper portions of the probe.

With my improved device, excellent results can be obtained and truly representative samples secured throughout the height of the material probe. It is within my contemplation to vary the pitch somewhat in accordance with the viscosity of the particular materials sampled although the ranges set forth herein are adequate to cover variations needed for materials having quite different viscosities.

It will, of course, be understood that various changes may be made in the form, details, arrangement and proportions of the parts without departing from the scope of my invention.

What I claim is:

A grain and seed probe for obtaining samples, comprising an elongated, tubular body having a plurality of elongated, vertically spaced, material-admitting passages extending longitudinally thereof, a stationary spiral, material-retaining element disposed axially within said tubular body and traversing substantially the full cross sectional area thereof and having a multiplicity of spiral convolutions between which grain or seed material is received and retained, entering through said openings, said body having an open upper end whereby the probe may be inverted and longitudinally shaken to eject the entire sample contained therein and the convolutions at the upper portions of said tubular member being spiralled more closely together and consequently of less pitch than the convolutions of said element adjacent the lower end thereof.

References Cited in the file of this patent

UNITED STATES PATENTS

| | | |
|---|---|---|
| 230,121 | Frost | July 20, 1880 |
| 262,847 | Stevens | Aug. 15, 1882 |
| 855,849 | Gray | June 4, 1907 |
| 1,078,847 | Grauenfels et al. | Nov. 18, 1913 |
| 2,688,877 | Peine | Sept. 14, 1954 |

FOREIGN PATENTS

| | | |
|---|---|---|
| 386,893 | Great Britain | Jan. 26, 1935 |